United States Patent [19]
Anderson

[11] 3,978,730
[45] Sept. 7, 1976

[54] INDICATING INSTRUMENTS
[75] Inventor: Edward W. Anderson, Cheltenham, England
[73] Assignee: Smiths Industries Limited, London, England
[22] Filed: Aug. 22, 1975
[21] Appl. No.: 606,812

[30] Foreign Application Priority Data
Aug. 23, 1974 United Kingdom............... 37215/74

[52] U.S. Cl............................ 73/387; 116/DIG. 43
[51] Int. Cl.².................... G01L 7/10; G01C 21/00
[58] Field of Search................. 73/387, 386, 178 R; 235/103, 119; 116/129 S, 129 T, DIG. 43

[56] References Cited
UNITED STATES PATENTS
2,208,728   7/1940   Menzer................................ 73/387
FOREIGN PATENTS OR APPLICATIONS
812,956   5/1937   France................................ 73/387

Primary Examiner—Donald O. Woodiel
Attorney, Agent, or Firm—Elliott I. Pollock

[57] ABSTRACT

An altimeter has a rotatably-mounted index that is driven to rotate through one complete revolution around a scale for each change of 1,000 feet in altitude sensed by two evacuated manometric capsules the number of revolutions of the index is indicated by numerical markings visible through an arcuate window which breaks into the scale against a 'zero' arrowhead at the top-center of the scale. The markings are distributed around the opaque circumferential-margin of a transparent disc that is mounted coaxially with the index and is driven in the counter direction to the index through step-down gearing. Successive ones of the numerical markings are rotated to the zero arrowhead to indicate the number of units of 1,000 feet appropriate to the altitude measurement, upon successive revolutions of the index. At least two of the markings are revealed in the window at any time so that throughout the transition between one revolution and the next of the index, for which the index is in the region of the zero datum, the relationship of the index to the revealed markings signifies which of those markings is appropriate to the altitude measurement at that time. Graduations of the disc intermediate the numerical markings are visible along an arcuate boundary of the window throughout a final sector of each revolution of the index to the zero datum, but are obscured by a step in the initial sector of the window where it extends on beyond the zero datum, so as to avoid ambiguity of reading in relation to the index. A digital-drum, indicator located behind the disc displays the ground-pressure datum-setting of the instrument, the indicator being visible via the transparent portion of the disc within a further window in the scale.

13 Claims, 5 Drawing Figures

INDICATING INSTRUMENTS

This invention relates to indicating instruments.

The invention is concerned in particular with indicating instruments of the kind in which indication of the value of a variable is provided partly by an index that is arranged to rotate through more than one revolution to pass the zero or other datum of the instrument scale in response to successive changes of unit quantity in the variable, and in which a member that bears graduation markings in terms of the said unit quantity is arranged to move relative to the scale in accordance with rotation of the index, but at a reduced speed, to provide coarse indication of the value of the variable in terms of said unit quantity.

Indicating instruments of this kind are applicable in many fields, but have been used notably in connection with altitude measurement in aircraft. In the latter context, altimeters have been proposed which have a circular altitude-scale and an index that rotates through one revolution for each change of, for example, 1,000 feet in altitude. The number of revolutions of the index, and therefore the number of units of 1,000 feet involved in the altitude measurement, is indicated by a separate graduated-scale that is coupled to the index through reduction gearing.

There is a significant possibility that the indication provided by an instrument of the above-specified kind will be mis-read. This arises especially when the index has nearly completed a revolution and is therefore approaching the zero of the scale, since at this time the number of units indicated by the additional scale or other graduated member will be close to change. In the case of the example of altimeter referred to above, the index will indicate '950' when the aircraft is at 7,950 feet, but the additional-scale indication of the number of 1,000-feet units, although lying between '7' and '8', will be very much nearer '8' than '7'. Thus there will be a significant danger that the indication of altitude will be read, incorrectly, as 8,950 feet instead of only 7,950 feet. Clearly such errors are undesirable, especially where, as in the case of an altimeter, they may endanger human life.

It is an object of the present invention to provide a form of indicating instrument of the specified kind for which the likelihood of mis-reading is reduced.

According to the present invention there is provided an indicating instrument of the kind specified wherein the graduated member is located to be viewed against the datum of the scale and thereby provide the coarse indication by reference to the positioning of its said graduation markings relative to the same datum as used for the index, and wherein the index throughout a limited sector of its rotation up to the datum, points to the graduated member between two of its graduation markings so as to emphasize which of those markings is appropriate to the coarse indication.

With the indicating instrument of the present invention the risk of error in reading the indication provided, is reduced by virtue of the direct association of the graduated member, and the coarse indication it provides, with the same datum as used for the index. In this connection the graduated member may be located behind the scale to be visible through an aperture that breaks into the scale at the datum position, and may with advantage take the form of a disc that is mounted for rotation coaxially with the index. The width of the aperture is preferably such as to ensure that at least two of the said markings on the graduated member are visible within the aperture at all times.

The fact that the index of the instrument according to the invention points to the graduated member throughout the limited sector of its rotation up to the datum, that is to say in the region of transition from one revolution to the next of the index, reduces the likelihood of error in reading of the coarse indication. As the index moves up to the datum it points between two of the graduation markings and in this way emphasizes which of those markings is appropriate to the coarse indication, irrespective of the fact that the higher of the two will at this time be closer to the datum. In the circumstances of the altimeter example given above, the index as it approaches the zero of the index-scale will move between the 7 and the 8 of the 1,000-feet units, and will in this way concentrate attention on the fact that the correct reading is appropriately between 7,000 and 8,000 feet.

The graduated member as well as being visible throughout the limited sector of index-movement up to the datum, may be visible beyond this also. However, if in this case the graduated member bears graduations intermediate the unit-quantity markings, there is the possibility that when the index is just beyond the datum position it may point to one of these intermediate graduations and thereby give rise to an ambiguity of presentation that might lead to error in reading. The likelihood of such error may be eliminated, or at least reduced, by obscuring the intermediate graduations where they would otherwise appear beyond the datum position. Where the graduated member is visible through an aperture in the scale, these intermediate graduations may be conveniently obscured by providing a step in the shaping of the aperture beyond the datum position.

An aircraft altimeter in accordance with the present invention will now be described, by way of example, with reference to the accompanying drawings, in which:-

Figure 2:
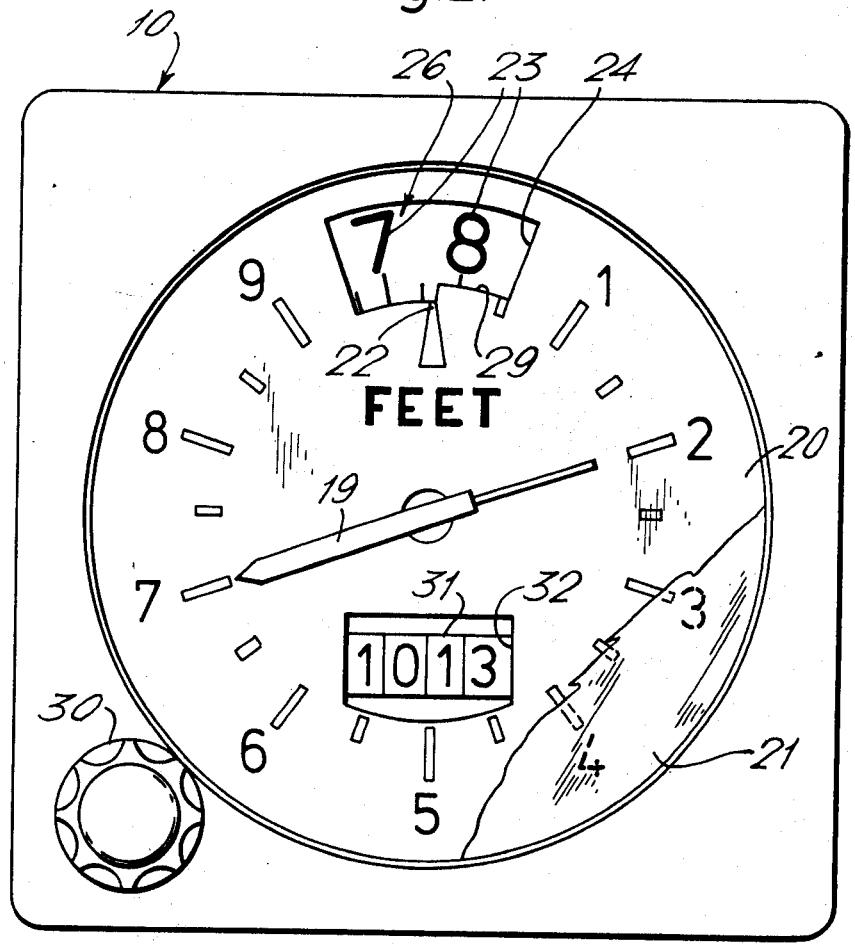
FIG. 2 is a front view of the altimeter.
Figure 3:
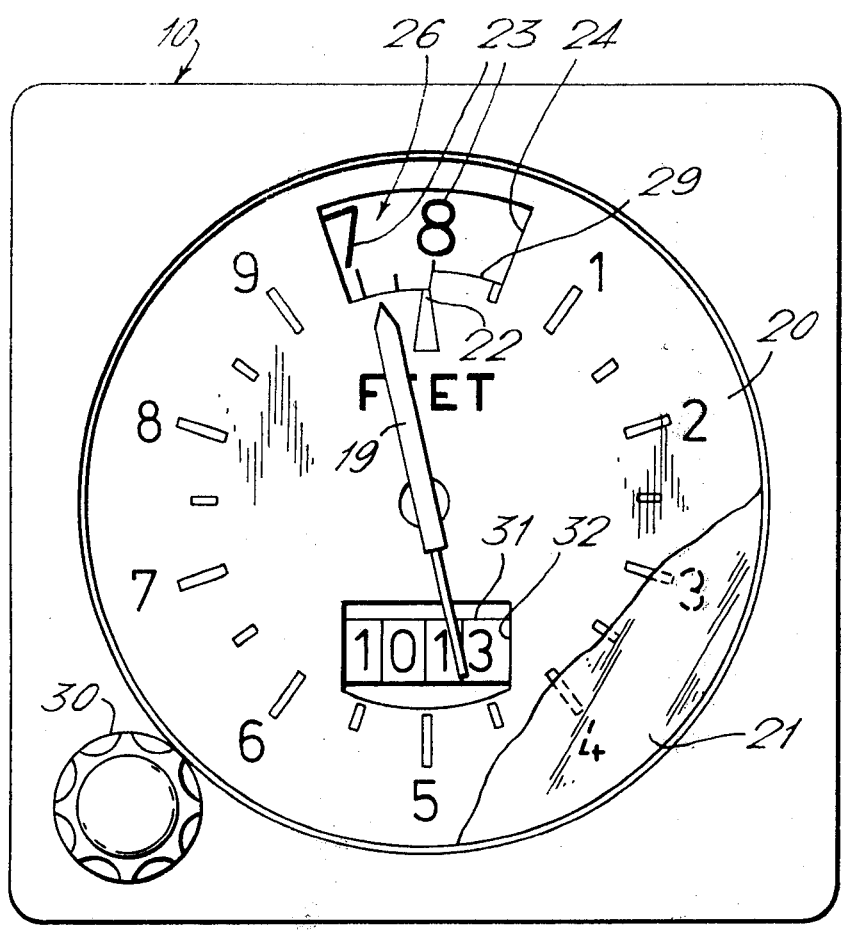
Figure 4:
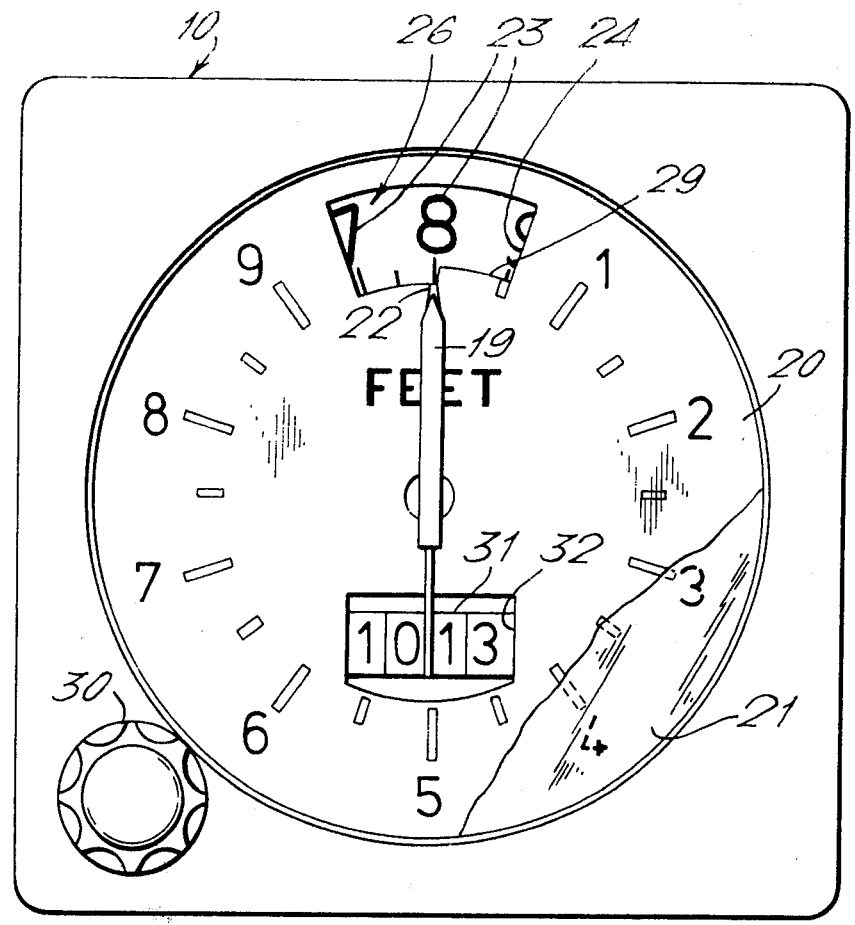
Figure 5:
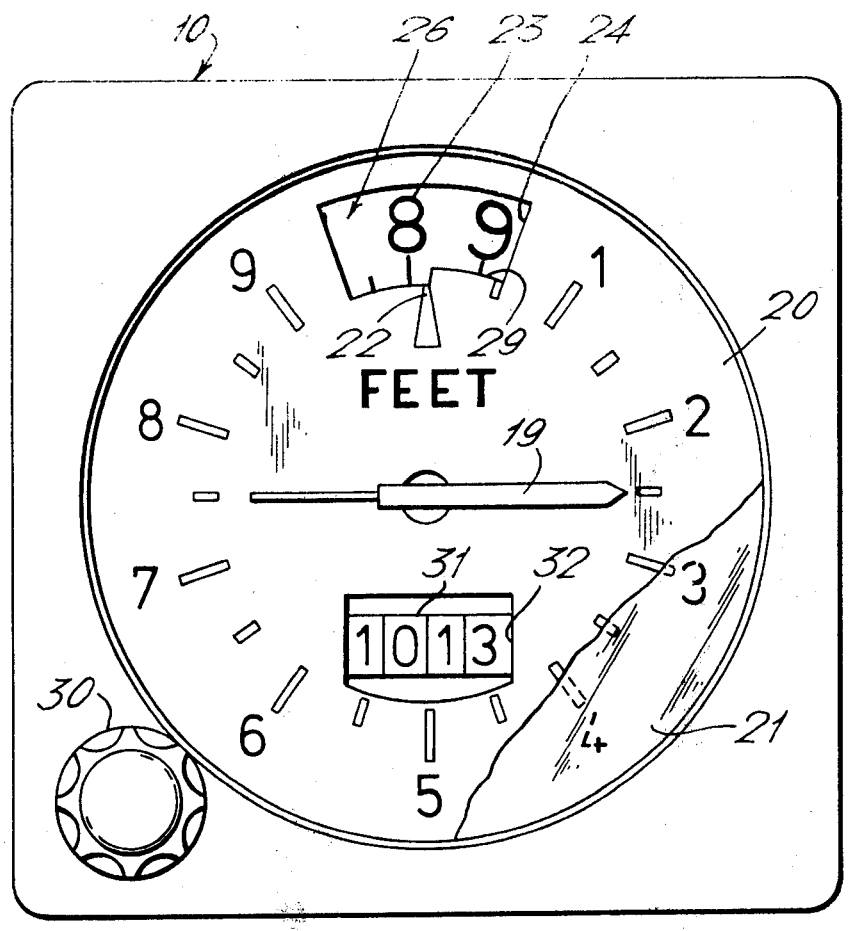

FIGS. 3 to 5 serve to show the indications provided by the altimeter at three successive stages during increase of altitude from the value indicated in FIG. 2.

Figure 1:
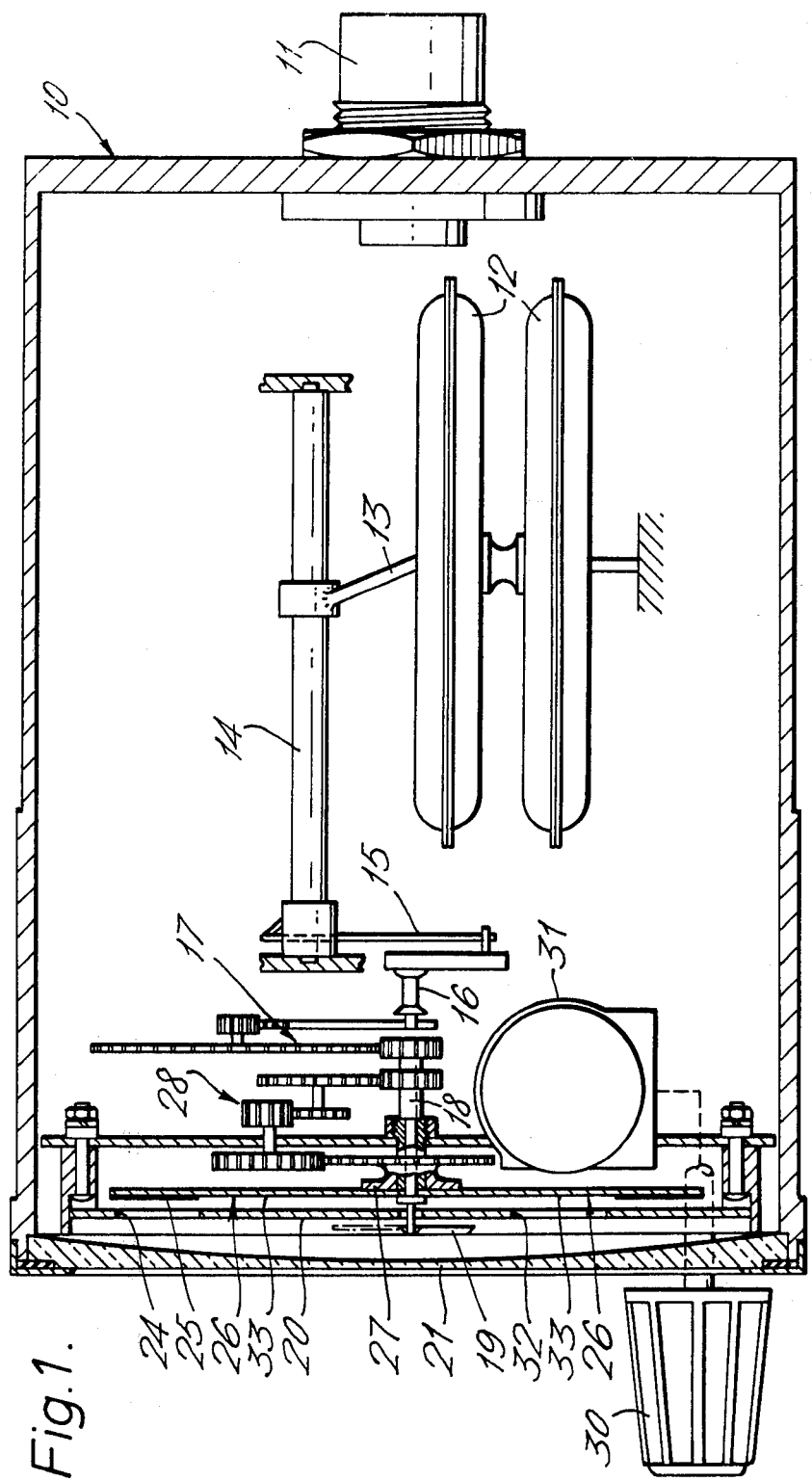
FIG. 1 is a schematic representation of the altimeter in longitudinal section.

Referring to FIG. 1, the altimeter has a sealed casing 10 that is adapted to be coupled via a pressure connector 11 to a static-pressure sensing device (for example, a pitot-static probe) of the aircraft. In this manner the casing-interior is maintained in operation at least approximately at the ambient freestream atmospheric pressure external to the aircraft, that is to say, at a pressure dependent on altitude. Two evacuated manometric capsules 12 are mounted one upon the other within the casing 10 to produce a combined deflection dependent on the pressure applied to the casing interior. This deflection is translated by a linkage 13 into angular displacement of a rocking-shaft 14 and thence via another linkage 15 into angular displacement of an intermediate-shaft 16. The linkages 13 and 15 act to translate the capsule deflection into angular displacement of the shaft 16 linearly-related to altitude.

The altitude-dependent displacement of the shaft 16 is transmitted via gearing 17 to an index-shaft 18 that is axially-aligned with the shaft 16. The shaft 18 carries an index 19 that, as illustrated in FIG. 2, is visible against a circular scale 20 through the transparent frontglass 21 of the casing 10. The gearing 17 produces one complete revolution of the shaft 18, and with it of the index 19 around the scale 20, for each change of 1,000 feet in altitude. The scale 20 is graduated to provide ten equal unit divisions, each representative of 100 feet, throughout the full 360° sweep of the index 19. These unit divisions, which are each sub-divided into 50-feet intervals, are numbered 1 to 9 around the scale 20 in a clockwise sense to the observer. The numbering starts from the scale zero which is indicated by an arrowhead 22 located centrally at the top of the scale 20.

The number of revolutions of the index 19, that is to say the number of units of 1,000 feet appropriate to the altitude measurement, is indicated by markings 23 that are visible through a window aperture 24 which breaks into the 'zero' arrowhead 22 at the top-center of the scale 20. These markings 23 are carried on the outer arcuate margin 25 of a toughened glass disc 26 and relate to graduation of the margin 25 into equal unit divisions each of which is representative of 1,000 feet and is itself divided into 500-feet intervals. The disc 26, is secured at its center to a flanged bush 27 that is mounted for rotation coaxially with the indexshaft 18 and is driven from the shaft 18 via step-down gearing 28. The numbering of the 1,000-feet units on the disc 26 is in a counter-clockwise sense to the observer, the step-down gearing 28 being such as to produce for each completed revolution of the index 19 in either sense, a single 1,000-feet unit angular-displacement of the disc 26 in the opposite sense.

Reading of the altitude measurement provided by the altimeter is taken by reference to the position of the disc 26 relative to the arrowhead 22 in the scale aperture 24, and to the position of the index 19 against the scale 20. The number of units of 1,000 feet appropriate to the reading is determined by the position of the disc 26, whereas the number of units of 100 feet, together with (at least) any additional 50-feet interval, is determined by the position of the index 19.

The aperture 24 in the scale 20 reveals only a small sector of the graduated margin 25 of the disc 26 in the region of the arrowhead 22 at any one time. The width of the aperture 24 is however large enough, and specifically as shown in FIG. 2, occupies the sector of the scale 20 corresponding to 950 feet through zero to 50 feet, so as to ensure that there are two of the numerical markings 23 of 1,000-feet units, visible to the observer at all times. This, together with the fact that the index 19 and disc 26 rotate in opposite directions to one another, serves to reduce the risk of error in the taking of an altitude reading. More especially there is reduction in the risk of error in reading which in other circumstances might easily occur in transition from one revolution to the next of the index 19 with change in the number of units of 1,000 feet. This arises from the fact that with the aperture 24 breaking into the scale 20 in the region of the zero position, the index 19 throughout the transition points to the disc 26 and by this signifies clearly in relation to the markings 23 which of them is applicable to the altitude measurement at that time.

If, for example, in the situation illustrated in FIG. 2, the altitude of the aircraft increases through 8,000 feet from the indicated value of 7,700 feet, the index 19 rotates clockwise towards the arrowhead 22 with the disc 26 at the same time rotating (at a reduced speed) counter-clockwise to bring the '8-unit' marking towards the arrowhead 22 also. With the index 19 approaching the arrowhead 22 it moves past the '7-unit' marking in the aperture 24 so that as illustrated in FIG. 3, it points to a position intermediate this marking and the '8-unit' marking, concentrating attention on the fact that the reading is appropriately between 7,000 and 8,000 feet. As illustrated in FIG. 4, the index 19 and the '8-unit' marking come together in alignment with the 'zero' arrowhead 22 at the altitude of 8,000 feet, and then, with increasing altitude, separate. The index 19 rotates on in the clockwise sense from the '8-unit' marking as illustrated in FIG. 5, to signify unmistakably that the correct reading is 'beyond', that is to say is now in excess of, 8,000 feet.

The possibility before the index 19 has rotated on from the 'zero' arrowhead 22 clear of the aperture 24, that some ambiguity of reading might arise from alignment or other disposition of the index 19 with respect to the 8,500-feet sub-division graduation, is eliminated, or is at least reduced, by means of a step 29 in the lower edge of the aperture 24. The step 29 serves to obscure any sub-division graduation of the disc 26 (in the case illustrated, specifically the 8,500-feet graduation) that would otherwise appear in the aperture 24 to the right, or 'above' in an altitude sense, the 1,000-feet unit appropriate to the measurement.

Similar considerations to those expressed above, apply to the avoidance of ambiguity of indication, and to other reduction of the likelihood of error, where the altitude rather than increasing, is decreasing through the transition from one unit of 1,000 feet to another. Such considerations also apply irrespective of the particular 1,000-feet unit involved, throughout the full operational-altitude range of the instrument.

Emphasis of the association between the divisions of the scale 20 and the markings 23 may be achieved by additional markings. For example in the latter respect, a line of red or other color may be provided to run around the upper left-hand quadrant of the scale 20 at a radius to be broken into by the bottom of the aperture 24. A line of the same color may then be provided on the disc 26 at the same radius so that the part of this which is visible in the bottom of the aperture 24 up to the step 29, completes the line on the dial.

Correction of the indication of altitude provided by the instrument for variation in the prevailing atmospheric pressure at ground level, is provided in a conventional way. In this respect a knob 30 on the front of the instrument casing 10 is rotatable to adjust (by means not shown) the setting of the ground-pressure datum to which the mechanism of the instrument operates to produce rotation of the index 19 and disc 26 relative to the scale 20. A digital-drum counter 31 is however coupled mechanically to the knob 30 to provide a four-digit indication in millibars of the value of the ground-pressure datum set in. Adjustment of the knob 30 adjusts the set-in value, and the digital indication provided by the drum counter 31, accordingly.

The display indication provided by the drum counter 31 is to appear within a second window aperture 32 in the scale 20, the aperture 32 being located just within the scale graduations vertically below the aperture 24. The disc 26, however, is located as closely as possible behind the scale 20 so as to avoid the possibility of parallax errors in the reading taken through the aperture 24. The drum counter 31 is therefore necessarily located behind the disc 26 in alignment with the aperture 32. But the central region 33 of the glass disc 26, lying inwardly of the opaque margin 25 bearing the markings 23, is transparent. Thus the indication provided by the drum counter 31 is clearly visible in the aperture 32 through the transparent central region 33 of the disc 26.

I claim:

1. In an indicating instrument having a scale and in which indication of the value of a variable is provided partly by an index that is arranged to rotate through more than one revolution to pass the zero or other datum of the said scale in response to successive changes of unit quantity in the variable, and in which said instrument further includes a member that bears graduation markings in terms of the said unit quantity and means for driving said member relative to the said scale in accordance with rotation of the index, but at a reduced speed compared with said index, to provide coarse indication of the value of the variable in terms of said unit quantity: the improvement wherein the said graduated member is located to be viewed against the datum of the scale thereby to provide the coarse indication by reference to the positioning of its said graduation markings relative to the same datum as used for the index, said driving means including means for driving said member past said scale datum in opposite sense to said index, and the index, throughout a limited sector of its rotation up to the datum, pointing to the graduated member between two of its graduation markings to emphasize which of those markings is appropriate to the coarse indication.

2. An indicating instrument according to claim 1, wherein the scale has an aperture therein that breaks into the scale at said datum, and the said graduated member is located behind the scale to present the said markings thereon for viewing within the aperture, the particular markings visible within the aperture at any time being dependent on the position of the said graduated member at that time.

3. An indicating instrument according to claim 2, wherein the said aperture has a width to provide that at least two of the said graduation markings are visible within the aperture at any time.

4. An indicating instrument according to claim 3, wherein said aperture has a first portion that occupies a part of said scale extending up to said datum and has a second portion that occupies another part of said scale extending from said datum.

5. In an indicating instrument having an instrument scale and in which indication of the value of a variable is provided partly by an index that is arranged to rotate through more than one revolution to pass the zero or other datum of the instrument scale in response to successive changes of unit quantity in the variable, and in which a member that bears graduation markings in terms of the said unit quantity is arranged for movement relative to the scale in accordance with rotation of the index, but at a reduced speed, to provide coarse indication of the value of the variable in terms of said unit quantity; the improvement wherein the graduated member is a disc mounted for rotation coaxially with the index, the said markings being distributed around a circumferential margin of the disc, the said disc being located to be viewed against the datum of the scale thereby to provide the coarse indication by reference to the positioning of its said graduation markings relative to the same datum as used for the index, the index, throughout a limited sector of its rotation up to the datum, pointing to the said disc between two of its graduation markings to emphasize which of those markings is appropriate to the coarse indication, the scale having an aperture therein that breaks into the scale at said datum, the said disc being located behind the scale to present the said markings thereon for viewing within the aperture, and the aperture being dimensioned to limit view of the disc to a small sector of its said circumferential margin, the particular sector of said margin and the particular markings visible within said aperture at any time being dependent on the rotational position of the disc at that time.

6. An indicating instrument according to claim 5, including an indicator device mounted behind the scale and the disc, said disc having a transparent portion radially inwards of said circumferential margin, said indicator device being located adjacent said transparent portion, and said scale having a further aperture therein aligned with said transparent portion and said indicator device to enable said indicator device to be viewed through said transparent portion of the disc.

7. An indicating instrument for providing an indication of the value of a variable, comprising: a scale having an arcuate window therein, scale having a zero datum located against an arcuate boundary of the window; an index mounted for rotation to sweep over said scale, the rotational sweep of said index passing closely along said arcuate boundary of the window throughout a final sector of each complete revolution of the index to said zero datum; sensor means responsive to said variable to rotate the index to an angular displacement from the zero datum dependent on the value of said variable, said sensor means being operable to displace the index angularly from said zero datum through more than one revolution depending upon said value; a rotatably-mounted member bearing a sequence of numerical markings distributed angularly from one another, said member being located behind the scale to present a limited sector of the said sequence of markings for view through the window, the particular sector of said sequence visible through the window being dependent on the angular position of the said member relative to the scale; and further means coupled to said sensor means for rotating the said member relative to the scale in accordance with, but at a slower speed than, the rotation of said index to bring successive ones of said sequence of numerical markings to said zero datum upon each successive revolution of the index past the zero datum, said further means being operable to rotate said member past said zero datum in opposite sense to the rotation of said index.

8. An indicating instrument according to claim 7, wherein the limited sector of the said sequence is of a length to include at least two of said numerical markings, the particular two being dependent on the angular position of the said member relative to the scale.

9. An indicating instrument according to claim 7, wherein the said zero datum lies intermediate the length of said window whereby said window has a portion thereof extending from the said zero datum throughout an initial sector of each complete revolution of the index.

10. An altimeter comprising: a scale having an arcuate window therein, said scale having a zero datum located intermediate the length of the window and against an arcuate boundary thereof; an index mounted for rotation to sweep over said scale, the rotational sweep of said index passing closely along said arcuate boundary of the window throughout a final sector of each complete revolution of the index to said zero datum; manometric sensor means to provide a measure of altitude; drive means coupled to said manometric sensor means to rotate the index to an angular displacement from the zero datum dependent on the magnitude of said measure of altitude, said drive means being operable to displace the index angularly from said zero datum through more than one revolution depending upon said magnitude; a rotatably-mounted disc bearing a sequence of numerical markings distributed angularly from one another circumferentially of the disc, said disc being located behind the scale to present a limited sector of the said sequence of markings for view through the window, the particular sector of said sequence visible throughout the length of the window including at least two of said markings and being dependent on the angular position of the said disc relative to the scale; and further means intercoupled with said drive means to rotate the said disc relative to the scale in accordance with, but at a slower speed than, the rotation of said index to bring successive ones of said sequence of numerical markings to said zero datum upon each successive revolution of the index past the zero datum, said further means being operable to drive said disc past said zero datum in opposite sense to said index.

11. In an indicating instrument having an instrument scale and in which indication of the value of a variable is provided partly by an index that is arranged to rotate through more than one revolution to pass the zero or other datum of the instrument scale in response to successive changes to unit quantity in the variable, and in which a member that bears graduation markings in terms of the said unit quantity is arranged for movement relative to the scale in accordance with rotation of the index, but at a reduced speed, to provide coarse indication of the value of the variable in terms of said unit quantity: the improvement wherein the said graduated member is located to be viewed against the datum of the scale thereby to provide the coarse indication by reference to the positioning of its said graduation markings relative to the same datum as used for the index and wherein the index, throughout a limited sector of its rotation up to the datum, points to the graduated member between two of its graduation markings to emphasize which of those markings is appropriate to the coarse indication, the scale having an aperture therein that breaks into the scale at said datum, the said graduated member being located behind the scale to present the said markings thereon for viewing within the aperture, the particular markings visible within the aperture at any time being dependent on the position of the said graduated member at that time, the said aperture having a width to provide that at least two of the said graduation markings are visible within the aperture at any time, said aperture having a first portion that occupies a part of said scale extending up to said datum and having a second portion that occupies another part of said scale extending from said datum, said graduated member bearing graduations intermediate said markings for viewing within said first portion of the said aperture, and said second portion of the said aperture having a step therein to obscure from view those of said intermediate graduations that would otherwise appear to view within said second portion of the aperture.

12. An indicating instrument for providing an indication of the value of a variable, comprising: a scale having an arcuate window therein, said scale having a zero datum located against an arcuate boundary of the window; an index mounted for rotation to sweep over said scale, the rotational sweep of said index passing closely along said arcuate boundary of the window throughout a final sector of each complete revolution of the index to said zero datum; sensor means responsive to said variable to rotate the index to an angular displacement from the zero datum dependent on the value of said variable, said sensor means being operable to displace the index angularly from said zero datum through more than one revolution depending upon said value; a disc mounted for rotation coaxially with said index, said disc bearing a sequence of numerical markings distributed angularly from one another, said disc being located behind the scale to present a limited sector of the said sequence of markings for view through the window, the particular sector of said sequence visible through the window being dependent on the angular position of the said disc relative to the scale; and means for rotating said disc relative to the scale in accordance with, but at a slower speed than and in opposite sense to, the rotation of said index to bring successive ones of said sequence of numerical markings to said zero datum upon each successive revolution of the index past the zero datum.

13. An indicating instrument for providing an indication of the value of a variable, comprising: a scale having an arcuate window therein, said scale having a zero located against an arcuate boundary of the window; an index mounted for rotation to sweep over said scale, the rotational sweep of said index passing closely along said arcuate boundary of the window throughout a final sector of each complete revolution of the index to said zero datum; sensor means responsive to said variable to rotate the index to an angular displacement from the zero datum dependent on the value of said variable, said sensor means being operable to displace the index angularly from said zero datum through more than one revolution depending upon said value; a rotatably-mounted member bearing a sequence of numerical markings distributed angularly from one another, said member being located behind the scale to present a limited sector of the said sequence of markings for view through the window, the particular sector of said sequence visible through the window being dependent on the angular position of the said member relative to the scale; means for rotating the said member relative to the scale in accordance with, but at a slower speed than and in opposite sense to, the rotation of said index to bring successive ones of said sequence of numerical markings to said zero datum upon each successive revolution of the index past the zero datum; said zero datum lying intermediate the length of said window whereby said window has a portion thereof extending from the said zero datum throughout an initial sector of each complete revolution of the index, said member bearing graduations intermediate said numerical markings for view within said window, and said instrument including means to obscure said intermediate graduations from view within said portion extending from said zero datum.

* * * * *